Jan. 15, 1946.  H. A. TOULMIN, JR  2,393,130
POWDER METALLURGY
Filed July 12, 1944  6 Sheets-Sheet 1

INVENTOR
HARRY A. TOULMIN JR.
BY
Toulmin & Toulmin
ATTORNEYS

Jan. 15, 1946.  H. A. TOULMIN, JR  2,393,130
POWDER METALLURGY
Filed July 12, 1944  6 Sheets-Sheet 3

INVENTOR
HARRY A. TOULMIN JR.
BY
Toulmin & Toulmin
ATTORNEYS

Jan. 15, 1946.   H. A. TOULMIN, JR   2,393,130
POWDER METALLURGY
Filed July 12, 1944   6 Sheets-Sheet 4

INVENTOR
HARRY A. TOULMIN JR.
BY
ATTORNEYS

Jan. 15, 1946. H. A. TOULMIN, JR 2,393,130
POWDER METALLURGY
Filed July 12, 1944   6 Sheets-Sheet 5

INVENTOR
HARRY A. TOULMIN JR.
BY
Toulmin & Toulmin
ATTORNEYS

INVENTOR
HARRY A. TOULMIN JR.
BY
ATTORNEYS

Patented Jan. 15, 1946

2,393,130

UNITED STATES PATENT OFFICE 2,393,130

POWDER METALLURGY

Harry A. Toulmin, Jr., Oakwood, Ohio, assignor to H-P-M Development Corporation, Wilmington, Del., a corporation Delaware Application July 12, 1944, Serial No. 544,565

13 Claims. (Cl. 219—3)

This invention relates to powder metallurgy and, more particularly, deals with a method and apparatus for compacting metal powders.

In the art of forming workpieces of metal powders it is of importance that the quality of the workpiece be uniform throughout. This requires that the compacted powders be alloyed or sintered uniformly throughout the completed workpiece in order to avoid porous, low strength areas. Inasmuch as the compacted workpiece is formed of discreet particles prior to the sintering operation, the conduction of heat therethrough is inhibited by the voids between the said particles. The consequence of attempting to sinter or alloy a workpiece compacted of powdered metals by heating the same from the surface inwardly leads to non-uniformity and density, electrical properties and mechanical quality.

Accordingly, the primary object of the present invention is to provide a method and apparatus particularly adapted to overcome the aforementioned difficulties and to produce compacted metal powdered articles characterized by uniformity of structure, electrical properties and mechanical quality.

This and other objects will become apparent upon reference to the following description taken in connection with the following drawings, in which.

General arrangement

In general, this invention comprises a first chamber adapted to receive a measured charge of metal powder and having associated therewith means for preheating the metal to somewhat below sintering or alloying temperature. Optionally, the metal powder may be preheated before placing the same in the said chamber.

The preheated metal having been placed in the first chamber, or the metal powder having been heated therein, the same is transferred to a compacting chamber where it is pressed by a pressing plunger into a compact mass. The compacting chamber may include means for heating the metal therein so as to sinter or alloy the same into a completed workpiece, but it is likewise conceivable that the workpiece may be further sintered in an oven subsequent to the final compacting and heating step.

The charge of powder which is to be compacted into a workpiece may be measured by volume or weight, either method producing satisfactory results.

The means for heating the metal in the preheating stage or in the compacting chamber or subsequent to the compacting step is, preferably, accomplished by means of high frequency electromagnetic induction. This method of heating permits the workpiece to be heated uniformly throughout its mass so as to produce a workpiece uniform as to density and other necessary qualities.

Figures 1, 2, 3:
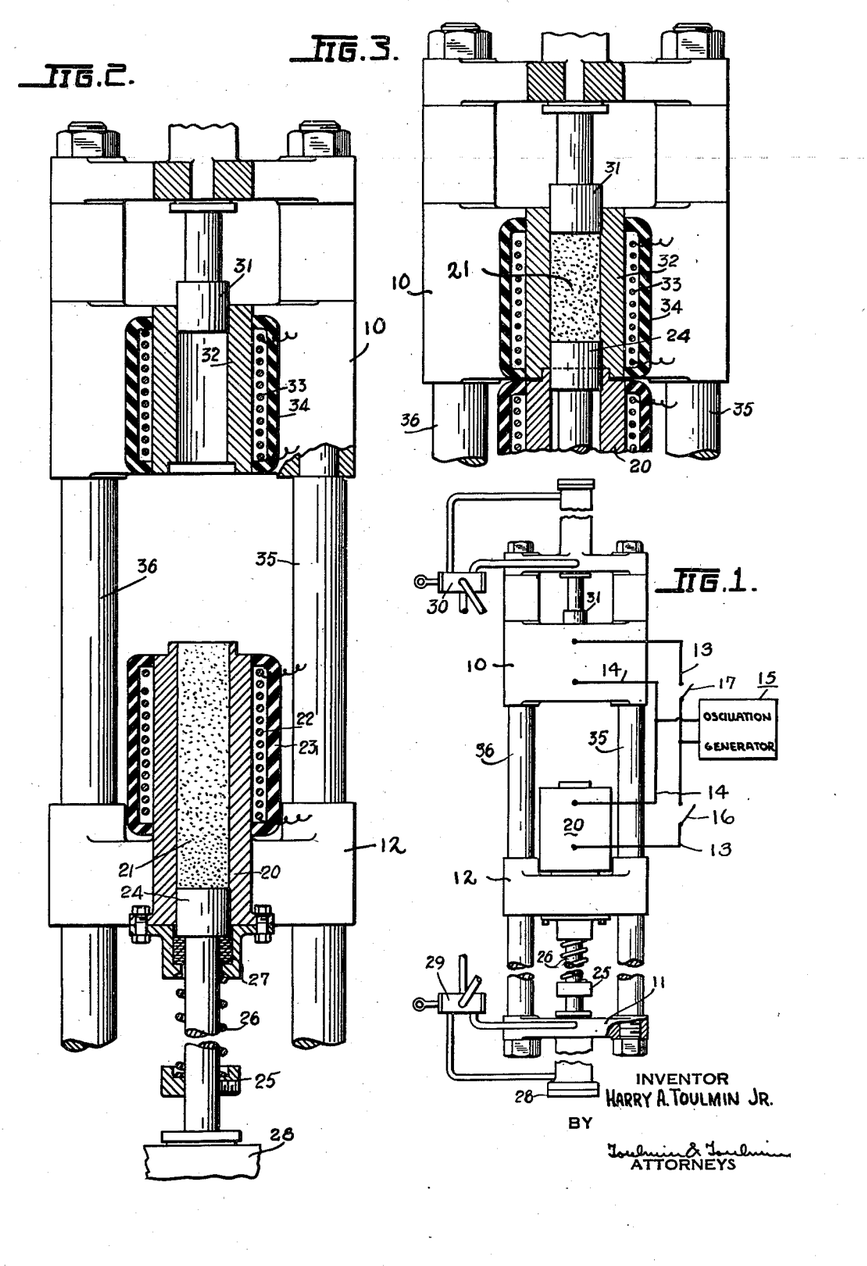
Figure 1 is an elevational view of a press adapted for the practice of this invention.
Figure 2 is an enlarged fragmentary view, partly in cross section, of the press shown in Figure 1.
Figure 3 is a fragmentary view similar to Figure 2 but showing the press parts during a different stage of the pressing process.

Structural arrangement of the embodiment of Figure 1

Referring to Figure 1, the press structure shown therein comprises a fixed bed or platen 10 which is connected by the strain rods 35 and 36 to the stationary cross head 11. Reciprocably mounted on the strain rods 35 and 36 is a movable platen 12 which carries a cylinder 20. The cylinder 20 is adapted to be moved into engagement with the cylinder 32, carried by the fixed platen 10, as shown in Figure 3.

The cylinder 20, which is a measuring and preheating cylinder, is surrounded by an induction coil 22 adapted to receive electrical energy for preheating a charge of powdered metal 21 within the cylinder 20. A sleeve 23 of insulating material surrounds the coil 22 so as properly thermally and electrically to insulate the said coil and the cylinder 20.

The platen 12 is supported by a spring 26 which bears against the collar 25 fixed to the plunger 24, the said plunger being reciprocable within the cylinder 20. The plunger 24 is attached to a motor means, preferably hydraulic, indicated at 28 which is supplied with actuating fluid through a four-way valve at 29. The hydraulic motor 28 is adapted to move the platen 12 and the cylinder 20 upwardly into the position shown in Figure 3, while the spring 26 is effective thereafter to permit the plunger 24 to move upwardly through the cylinder 20 to transfer a charge of powdered metal 21 into the compacting cylinder as shown in Figure 3.

The compacting cylinder, indicated at 32, is carried by the fixed platen 10 and has reciprocably mounted therein the plunger 31. The plunger 31 forms a bottom against which the powder 21 is compacted and also serves as an ejector plunger following the compacting and sintering of the powder within the cylinder. The plunger 31 may be actuated by a hydraulic motor which is supplied with actuating fluid through a four-way valve 30.

The compacting cylinder 32 is surrounded by an induction coil 33, similar to the coil 22 in Figure 2, and an insulating sleeve 34 surrounds the said coil and cylinder.

The coils 22 and 33 are connected by the wires 13 and 14 with an oscillation generator generally indicated at 15. The generator 15 may be of any type capable of producing alternating current of the desired frequency and voltage for inducing in the powdered metal sufficient magnetic and electric losses to produce the desired heating effect.

As seen in Figure 2, the plunger 24 is urged downwardly relative to the cylinder 20 by the spring 26 until the shims 27 engage the underside of the enlarged end portion of the plunger 24. It will be apparent that the capacity of the cylinder 20 may be varied by varying the number or thickness of the shims 27 so as to vary the amount of powdered metal which may be contained within the said cylinder.

Operation of the embodiment of Figure 1

In operation the parts of the press shown in Figure 1 are initially positioned as indicated in Figure 2. The cylinder 20 is then filled with powdered metal, the exact quantity depending on the arrangement of shims at 27. The induction coil 22 is then energized by closing the switch 16 in the wire 13 thereby completing the circuit to the oscillation generator 16. After a predetermined length of time the switch 16 may be opened and the valve 29 shifted to actuate the motor 28 to move the platen 12 and cylinder 20 upwardly into their Figure 3 position. After the cylinder 20 engages the lower end of the cylinder 32 the spring 26 is effective to permit the plunger 24 to continue to advance to transfer the charge of preheated powdered metal into the compacting cylinder 32. The metal powder is compacted within the cylinder 32 between the plungers 24 and 31. Prior to, during or subsequent to the compacting of the powder, the switch 17 may be closed to energize the coil 33. Sufficient power is delivered to the coil 33 and, therefore, to the powder 21 to bring the same to sintering or alloying temperature.

When the workpiece has been completely compacted and sintered, the cylinder 20 and plunger 24 are returned to their Figure 2 position and the valve 30 is shifted to actuate the hydraulic motor associated with the plunger 31 to cause the work-piece to be ejected from the compacting cylinder. The plunger 31 is then returned to its upper position and a new cycle of operations may be commenced.

It will be apparent that the plungers 24 and 31 may, if desired, be withdrawn from the cylinder 32 during the sintering operation in order not to detract from the heating effect of the field of electromagnetic induction set up by the coil 33.

Figure 7:
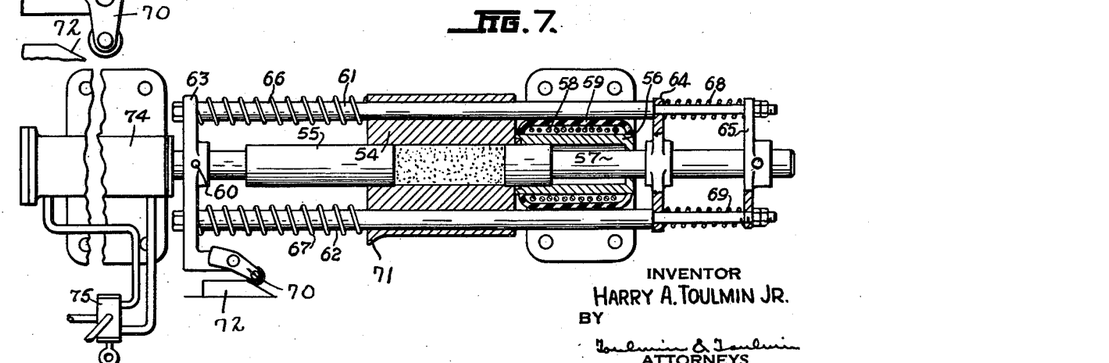
Figure 7 is a view, partly in section, of the apparatus of Figure 4 showing more fully the construction thereof.

Structural arrangement of the embodiment of Figure 7

Referring now to Figures 4 to 7 inclusive, a somewhat modified arrangement of a press according to this invention is shown. In this modification the measuring and compacting cylinders are arranged horizontally and the powdered material is fed into the former from a hopper through a passage wherein the metal may be preheated.

The general arrangement, without the hopper, is shown in Figure 7. In this figure, the measuring cylinder or chamber indicated at 54 is slidably mounted on the rods 61 and 62. The rods 61 and 62 are joined at one end by the cross head 63 rigidly attached thereto and at the other end by the cross heads 64 and 65, slidable thereon. The springs 66 and 67 mounted, respectively, on the rods 61 and 62, bear between the cross head 63 and the chamber 54, urging the latter rightwardly into engagement with the compacting cylinder 56.

The compacting cylinder 56 is stationary and has reciprocably mounted therein the plunger 57 which is rigidly attached to the cross head 65. The compacting cylinder 56 has associated therewith the induction coil 58 and insulating sleeve 59 arranged in a manner similar to that of the coil 22 and sleeve 23 of Figure 2.

Reciprocably mounted within the chamber 54 is a plunger 55 which is pinned to the cross head 63 as at 60 and to which is attached the hydraulic motor 74. The actuation of the motor 74 and, therefore, the cross head 63 and the plunger 55 is controlled by the four-way valve 75.

For a purpose which will become apparent hereinafter, the cross head 63 carries a latch member 70 which is adapted to engage a cooperating portion 71 on the chamber 54. The latch member 70 is pivotally mounted on the cross head 63 and is adapted to engage the portion 71 when the plunger 55 is in its extreme right hand position to be disengaged therefrom when the plunger is in its extreme left hand position by the cam 72.

The cross head 64 is engaged by the springs 68 and 69 which urge the same leftwardly to be engaged by shoulders on the rods 61 and 62. The purpose of this arrangement is to permit the plunger 57 in the cylinder 56 to halt when bottomed on the end of the said cylinder while permitting the plunger 55 and the rods 62 and 61 to continue their rightward movement to compact the metal within the compacting cylinder.

Figure 4:
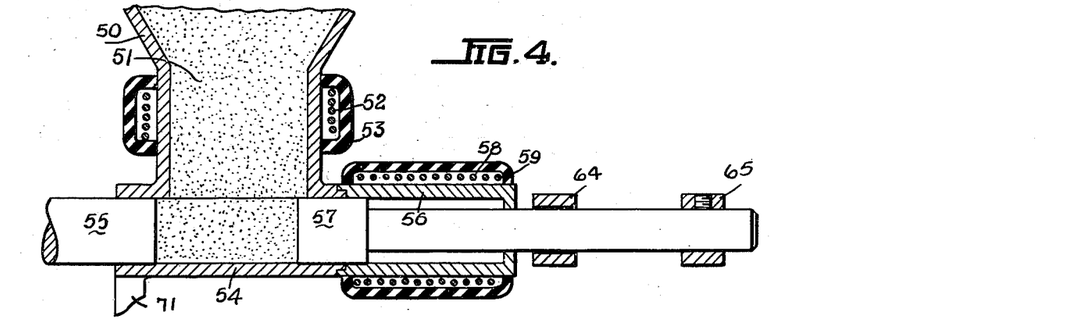
Figure 4 is a sectional view through a modification of the apparatus of this invention.

Referring to Figure 4, the hopper 50 is shown to be connected with the chamber 54 and to have arranged therearound the induction coil 52 and the insulating sleeve 53. The powdered metal within the hopper 60 is heated within the zone 51 as it is fed into the chamber 54.

*Operation of the embodiment of Figure 7*

Referring to Figures 4 and 7, the plungers 55 and 57 are shown disposed within the chamber 54 to receive a charge of powdered metal therebetween. The powder has been preheated in passing through the zone 51 and is, therefore, at a temperature preferably somewhat below the sintering temperature of the material.

Figure 5:
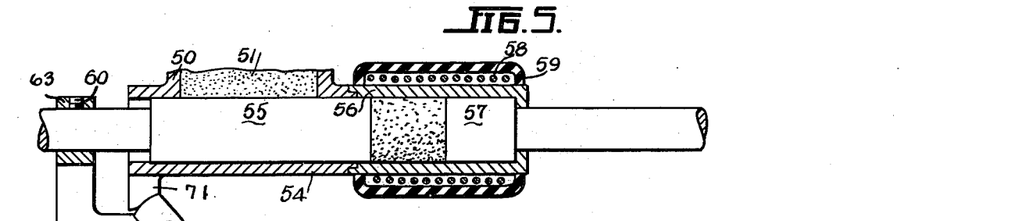
Figure 5 is similar to Figure 4, but showing an apparatus after the workpiece has been compacted therein.

The charge is transferred to the compacting chamber by the actuation of the valve 75 which actuates the motor 74 to move the plunger 55 and the cross head 63 to the right into the position shown in Figure 5. As the plunger and cross head move to the right, the rods 61 and 62 likewise move to the right and, through the cross head 64 and the springs 68 and 69, urge the cross head 65 and the plunger 57 attached thereto to the right also. When the plunger 57 bottoms against the right hand end of the cylinder 56 the springs 68 and 69 permit the rods 61 and 62, cross heads 64 and 63 and the plunger 55 to continue the rightward movement. The continued rightward movement of the plunger 55 is effective to compact the powdered metal within the chamber 56 as is indicated in Figure 5. During this time the compacted powder is heated by electromagnetic induction from the coil 58 which has been energized.

As the plunger approaches its Figure 5 position the latch member 70 engages the member 71 on the chamber 54 as seen in Figure 5. Following the complete sintering of the workpiece, or as much of the sintering cycle as it is desired to accomplish within the chamber 56, the valve 75 is shifted so as to actuate the motor 74 to retract the plunger 55 from the compacting chamber.

As the plunger 55 retracts it carries with it the chamber 54 because of the engagement of the latch 70 with the member 71. Also, after plunger 55 has retracted a predetermined amount the rods 61 and 62 which are moving with the plunger 55 are effective to engage the cross head 65 and forcibly to eject the completed workpiece or briquette from the chamber 56. This stage of the cycle is indicated at Figure 6 where the chamber 54 is retracted from the chamber 56 and the plunger 57 is ejecting the briquette from the machine.

Figure 6:
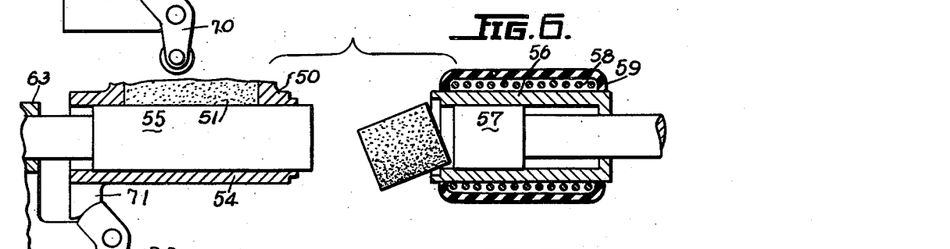
Figure 6 is a view similar to Figure 4 but shows the workpiece being ejected from the compacting cylinder.

A further retracting movement of the plunger 55 from the position indicated in Figure 6 brings the cam 72 into engagement with the latch member 70, rotating the latter counterclockwise and releasing the member 71 from engagement therewith. The springs 66 and 67 are then effective to move the chamber 54 to its Figure 7 position in engagement with the chamber 56. The springs 66 and 67 are of such a size that the movement of the chamber from its Figure 6 position to its Figure 7 position is accomplished with sufficient speed that the powder within the hopper does not have an opportunity to pour from the open end of the chamber 54. Rather, the sudden movement of the chamber 54 into engagement with the chamber 56, and the sudden halting thereof by the chamber 56, is effective to break any voids which may exist in the hopper and to promote the free flow of the powder therein into the measuring chamber.

It will be apparent that the precise amount of powder transferred from the chamber 54 into the compacting chamber 56 is variable by adjusting the nuts at the right end of the rods 61, 62. Thus, the construction shown in Figure 7 provides for a device which, by means of a single motor, automatically measures a charge of powder, transfers the measured charge into a compacting chamber, compacts the same therein while inductively heating the same, and thereafter ejects the briquette and automatically returns the press parts to their initial position.

Figures 8, 9:
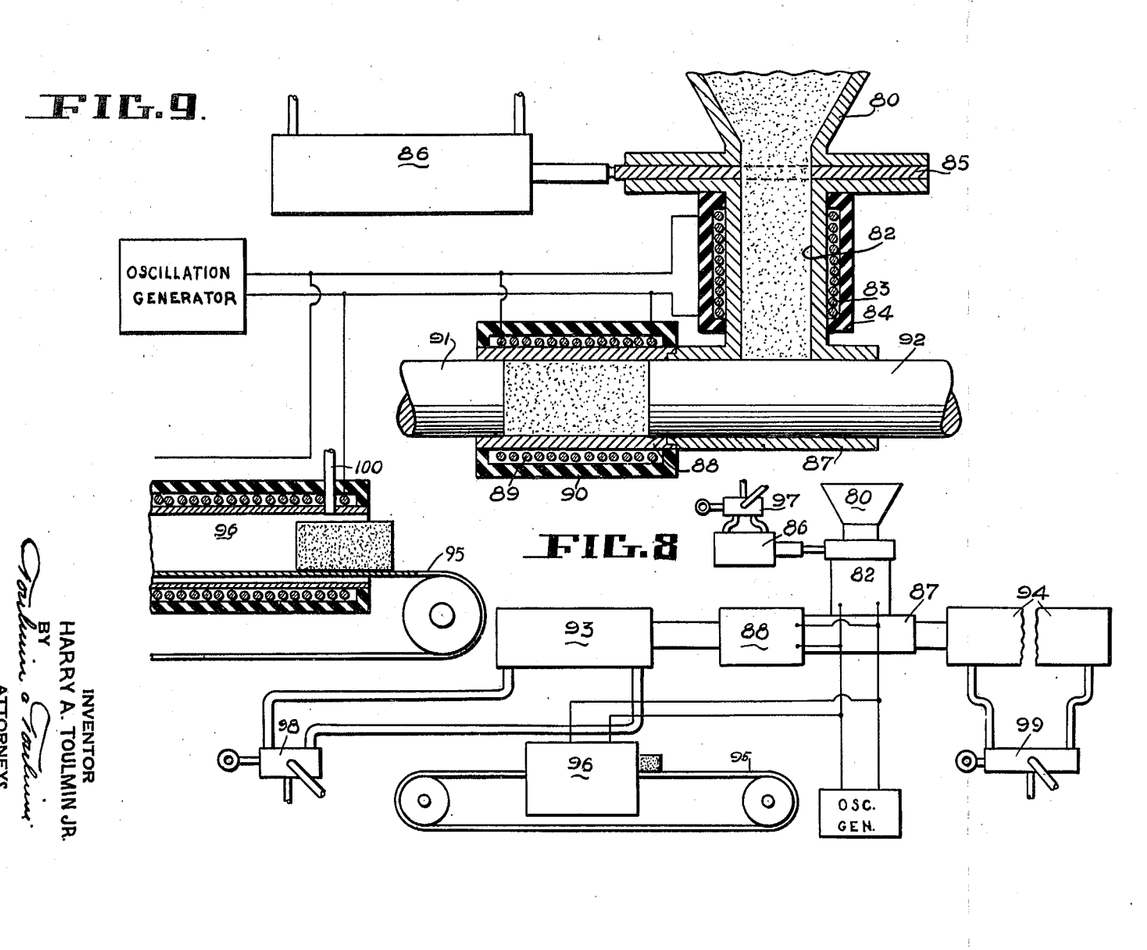
Figure 8 is a diagrammatic elevational view of another modification of a press structure according to this invention.
Figure 9 is an enlarged sectional view of a portion of the apparatus of Figure 8.

*Structural arrangement of the modification of Figure 8*

In Figure 8 is shown an arrangement wherein a measuring chamber 87 and a compacting chamber 88 are arranged in abutting relationship in axial alignment. The powdered metal is fed into the chamber 87 from a hopper 80 through a passage 82 which is surrounded by an induction heating coil 83 which latter is suitably insulated by a sleeve 84. The flow of powder from the hopper 80 into the passage 82 is controlled by a gate 85 which is reciprocable by a hydraulic motor 86. The motor 86 is reciprocated by means of a four-way valve 97 connected thereto. Reciprocably mounted within the measuring and compacting chambers are a pair of plungers 91 and 92 which are actuated, respectively, by the hydraulic motors 93 and 94. The hydraulic motors 93 and 94 are actuated respectively by hydraulic fluid from the four-way valves 98 and 99.

The compacting chamber 88 is surrounded by the induction coil 89 which is electrically connected with any suitable source of high frequency electrical energy. An insulating sleeve 90 surrounds the chamber 88 and the coil 89 so as to insulate the same electrically and thermally.

Arranged in operatively associated relation with the press proper is a sintering furnace or chamber comprising a conveyor 95 and an inductively heated passage 96 through which the said conveyor passes. The passage 96 is provided with a heating coil and an insulation sleeve similar to the chamber 88. For the purpose of preventing oxidation or other undesirable chemical changes in the workpiece as it passes through the sintering furnace, the atmosphere thereof may be controlled by a conduit 100 which may supply any suitable inert gas to the passage 96 so as to blanket the workpiece during its passage through the sintering furnace.

*Operation of the embodiment of Figure 8*

In the operation of the modification shown in Figures 8 and 9, the plungers 91 and 92 are moved into the measuring chamber so as to receive a predetermined charge therebetween. This charge, which has been preheated in the passage 82, may be controlled volumetrically by the manipulation of the gate 85. The plungers 91 and 92, having received the predetermined charge, are moved into the compacting chamber 88 so as to occupy the positions indicated in Figure 9. The plunger 91 or 92 is then halted while the other plunger is actuated so as to compact the material between the plunger faces. For some predetermined period during the time that the metal powder is within the compacting chamber, the coil 89 is energized so as to heat the said powder to any desired temperature. In this instance the material is preferably only partially sintered, the final sintering stage taking place within the passage 96 of the sintering oven.

Following the accomplishment of any desired degree of sintering of the workpiece, the plunger 91 is withdrawn from the chamber and the plunger 92 is actuated to eject the workpiece. Subsequent to the ejection of the workpiece from the compacting chamber, various machining or shaping operations may be performed thereon before the final sintering step. Following the accomplishment of whatever operation it is desired to perform on the workpiece, it is placed on the conveyor 95 and passed through the passage 96 where it comes under the influence of the heating coil associated with the sintering oven and becomes completely sintered.

It is evident that the energization of the induction coils surrounding the passage 82, the compacting chamber and the passage 96 may be controlled by switches or rheostats in any manner that is desirable in the operation of the device.

Figures 10, 11, 12:
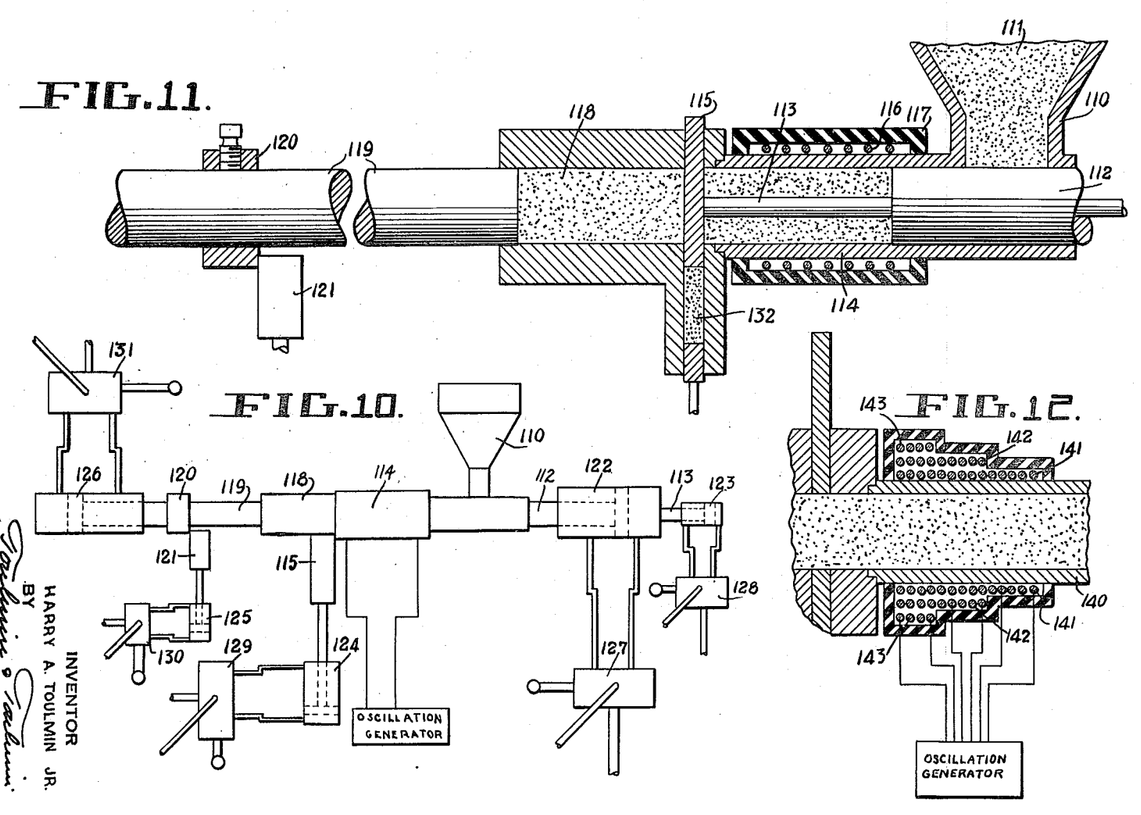
Figure 10 is a diagrammatic elevational view of still another modified structure arranged according to this invention.
Figure 11 is an enlarged sectional view of a portion of the structure shown in Figure 10.
Figure 12 is a fragmentary view of the preheating cylinder of Figure 10 illustrating a modified arrangement of the heating apparatus therefor.

*Structural arrangement of the embodiment of Figure 10*

The arrangement shown in Figures 10 and 11 comprises a horizontally disposed preheating and measuring chamber 114 which has associated therewith an induction heating coil 116 and a surrounding insulating sleeve 117. Attached to one end of the chamber 114 is a hopper 110 which is filled with powdered metal as indicated at 111. Reciprocably mounted within the chamber 114 is a plunger 112 which is bored to receive an ejector plunger 113.

The end of the chamber 114 opposite the hopper 110 is adapted to be closed by a gate 115 which is apertured as at 132 to permit the passage therethrough of powdered metal. Adjacent the gate 115 opposite the chamber 114 is the compacting chamber 118 which has reciprocably mounted therein the plunger 119.

Referring more particularly to Figure 10, it will be seen that the plunger 112 is connected with a hydraulic motor 122 and that the ejector plunger 113 is connected with a hydraulic motor 123, the ejector plunger passing completely through the motor 122. The supply of actuating fluid to the motor 122 is controlled by the four-way valve 127 while the valve 128 affords a similar control for the motor 123. In a similar manner the gate 115 is actuated by a hydraulic motor 124, the movements of which are controlled by the four-way valve 129. The plunger 119 is reciprocated by a motor 126 which is connected to a fluid source through the four-way valve 131.

Attached to the plunger 119 is a collar 120 which is adapted to engage a reciprocable stop member 121, the stop member being reciprocated by the motor 125 which is connected through the valve 130 with a fluid source. The stop member 125 is adapted, when moved into the path of the collar 120, to stop the plunger 119 in its Figure 11 position. When the stop member 123 is withdrawn from the path of the plunger 120, the plunger 119 is free to advance toward the gate 115 to compress the material within the compacting or briquetting chamber.

After the compacting of the material within the compacting chamber, the plunger 119 is retracted out of the chamber, the gate 115 is actuated to bring the aperture 132 into alignment with the compacting chamber and the ejector plunger 113 is actuated to remove the briquetted workpiece from the machine. Following the ejection of the workpiece, the plunger 113 is retracted, the plunger 119 is moved forward to its Figure 11 position into engagement with the stop member 121, and the plunger 112 is actuated to move a new charge of material into the briquetting chamber. After the actuation of the plunger 112, the gate 115 is moved down to its Figure 11 position so as to close off the end of the chamber 118 and the compacting stroke of the plunger 119 may now be commenced. Following the closure of the gate 115, the plunger 112 is retracted beyond the opening of the hopper 110 so that a new charge of material falls into the chamber 114. The plunger 112 is then moved to its Figure 11 position compressing the powder into a compacted mass so that the energization of the coil 116 is effective efficiently to heat the powdered material. It will be evident that the precompressing and heating of the powder within the chamber 114 may take place simultaneously with the compacting of the material within the chamber 118, thus providing for a relatively rapid cycle. Preferably, the material is heated within the chamber 114 to sintering temperature and then quickly compacted within the chamber 118 but it is conceivable that the temperature to which the powder is brought within the preheating chamber may be sufficient to cause only partial sintering. In the latter event, a subsequent sintering step would be preformed in order completely to sinter the briquette or workpiece.

In Figure 12 a modified arrangement of the heating coils around the preheating chamber is shown. In this figure the heating chamber is indicated at 140 and the induction coil is wound in steps 141, 142 and 143 so as to give progressively greater heating effect toward the compacting chamber. In this way the coils may be energized during the period of transfer of the material from the preheating chamber to the compacting chamber thereby rapidly to bring the said powder to sintering temperature immediately prior to entering the compacting chamber.

Figure 13:
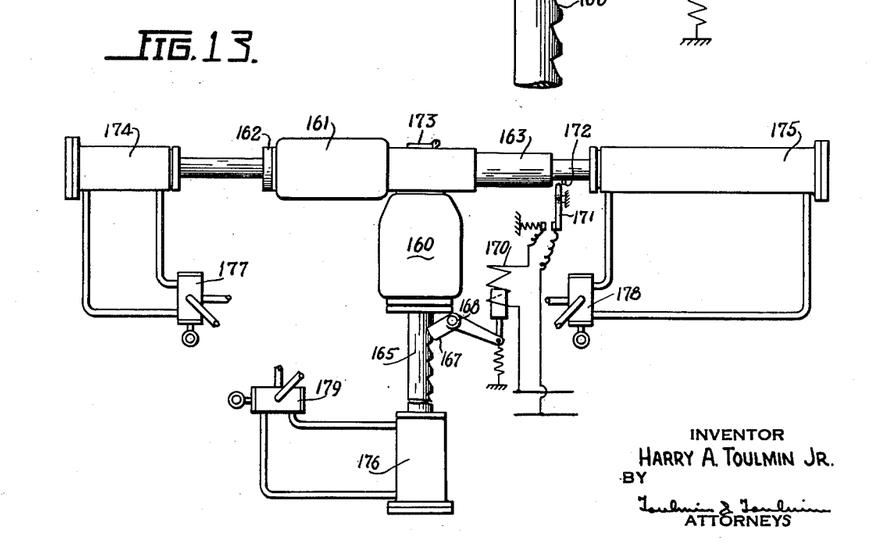
Figure 13 is a diagrammatic elevational view of another modified press arrangement constructed according to this invention.

*Structural arrangement of the modification of Figure 13*

Figure 14:
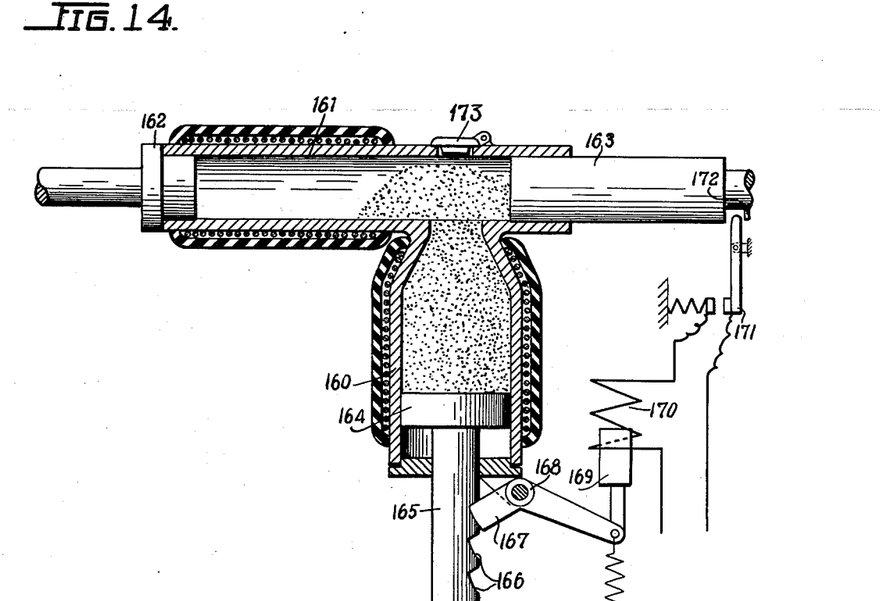
Figure 14 is an enlarged sectional view of a portion of Figure 13.

The arrangement shown in Figures 13 and 14 is similar to the arrangement shown in Figures 8 and 10 but provides for an automatic measuring device of somewhat different design. The compacting chamber indicated at 161 is suitably fitted with an induction heating coil and is closed at one end by a member 162 which is attached to a hydraulic motor 174 which reciprocates the said member into and out of engagement with the chamber 161. The hydraulic motor is controlled by a four-way valve 177 so as to accomplish the said reciprocation of the member 162.

Reciprocably mounted in the chamber 161 opposite to the member 162 is a plunger 163. The plunger 163 is adapted to be reciprocated by the motor 175 which is controlled by the four-way valve 178. The plunger 163 is adapted to compact the material against the member 162 and within the chamber 161.

Attached to the chamber 161 to the lower side thereof is a preheating chamber 160, fitted with an induction heating coil, and having reciprocable therein a piston 164 attached to a plunger 165 which is actuated by a motor 176. The motor 176 is supplied with actuating fluid from a four-way valve 179.

The plunger 165 is provided with a plurality of equidistantly spaced notches 166 which are adapted to be engaged by a member 167 pivotally mounted at 168 on the chamber 160. The member 167, has attached thereto an armature 169 of a solenoid 170 which is adapted to be energized by a limit switch 171 when the latter is actuated by the cam 172 on the ram 163. The member 167 is urged into engagement with the notches 166 by a spring and is moved out of engagement with the said notches by the armature 169 when the solenoid 170 is energized.

The chamber 160 is filled through an opening indicated at 173 in the top of the chamber 161 directly opposite the said chamber. The chamber 160 is filled when the piston 164 is in its lowermost position and, as the piston moves upwardly the material is displaced in measured quantities into the compacting chamber 161.

*Operation of the embodiment of Figure 13*

In the operation of the embodiment of Figure 13, the piston 164 is retracted to its Figure 14 position by the motor 176 and the chamber 160 is filled through the opening 173. The valve 179 is then shifted to actuate the motor 176 to urge the plunger 165 and the piston 164 upwardly, the upward movement being halted by the engagement of the member 167 with the uppermost of the notches 166.

The valve 177 is then shifted to actuate the motor 174 to move the member 162 into position in the end of the compacting chamber. Assuming that there is a charge of material within the chamber 161, the valve 178 is now shifted to actuate the motor 175 to drive the pressing plunger 163 leftwardly to compact the said charge within the compacting chamber. As with the previous modifications, the induction coil surrounding the compacting chamber may be energized for any predetermined period during the compacting cycle for accomplishing any degree of sintering desired in the workpiece or briquette. Following the compacting and sintering, the valve 177 is shifted to actuate the motor 174 to withdraw the member 162 from the end of the compacting chamber, thus allowing the plunger 163 to eject the workpiece.

Following the ejection of the workpiece, the valve 178 is shifted to retract the plunger 163 to its Figure 13 and 14 position while the valve 177 may be shifted to return the member 162 to working position. During the retraction stroke of the plunger 163, the cam 172 engages the switch 171 and momentarily closes the same. The momentary closing of the switch 171 energizes the solenoid 170 to actuate the armature 169 thereby withdrawing the member 167 from engagement with the notch 166. The disengagement of the member 167 from the notch 166 is effective to permit the motor 176 to move the plunger 165 and piston 164 upwardly to displace a charge of material from the preheating chamber into the compacting chamber. The solenoid 170 is energized only so long as is necessary to accomplish the disengagement of the member 167 from the notch 166. Therefore, as the next notch 166 approaches the member 167, the latter will be urged into engagement with the notch and the plunger 165 will be halted in a predetermined position thus permitting the piston 164 to displace only a predetermined amount of material into the compacting chamber.

The induction coil associated with the measuring chamber is either continuously or intermittently energized to preheat the material within the chamber to any desired temperature. This may be accomplished in any desirable and well known manner similar to those described in connection with the other modifications.

Figure 15:
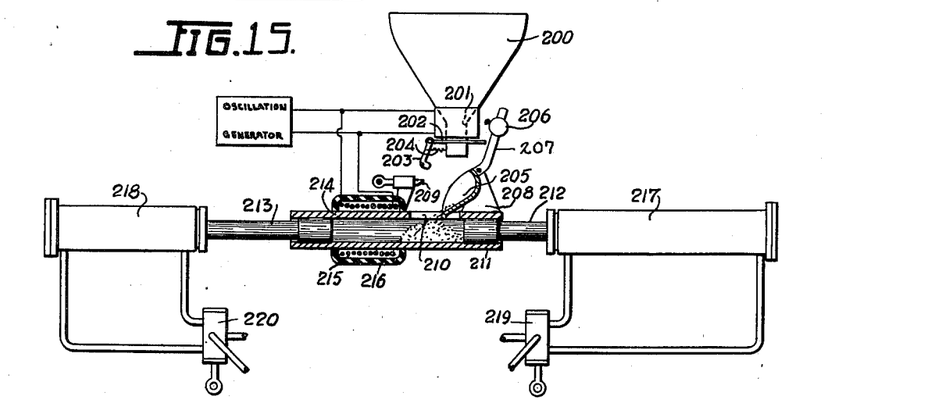
Figure 15 is a diagrammatic view, partly in section, of another modified press structure including an automatic weighing device and constructed according to this invention.
Figure 16:
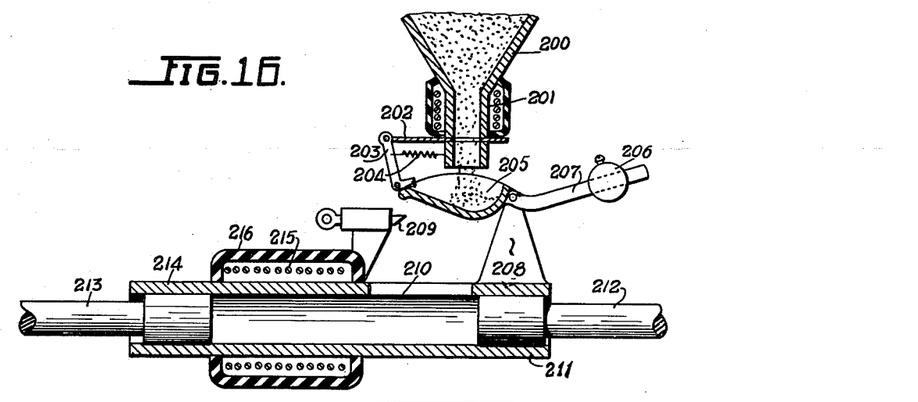
Figure 16 is an enlarged sectional view of a portion of Figure 15 showing the press parts in a different stage of the operating cycle.

*Structural arrangement of the modification of Figure 15*

In Figure 15 there is shown an arrangement whereby the measuring of the material is accomplished by weight rather than volumetrically. Referring to Figure 15, there is a chamber 211 having an opening 210 through which the material is introduced. Reciprocably mounted within the chamber 211 are the compacting plungers 212 and 213 which are actuated, respectively by the fluid operable motors 217 and 218 which are in turn controlled, respectively by the four-way valves 219 and 220.

Arranged around the compacting zone of the chamber 214 is an induction coil 215 and an insulating sleeve 216. The induction coil 215 is supplied with electrical energy from an oscillation generator of any suitable design.

Referring to the feeding arrangement, this comprises a hopper 200 having a feed passage at 201 which is adapted to be closed by a gate 202. The gate 202 is actuated by an arm 203 which is urged toward gate closing position by a spring 204. Arranged beneath the hopper 200 is a container 205 which is pivotally mounted on a bracket 208 attached to the chamber 211. The container 205 has integral therewith an arm 207 and an adjustable weight 206. Preferably, the arm 207 is arranged so that the moment arm of the weight substantially decreases when the container delivers its charge to the compacting chamber in order to prevent the container from returning to its original position before the charge is completely delivered to the chamber.

The container 205, in its uppermost position, engages the arm 203 thus moving the gate 202 to open position. The downward movement of the container may be halted by a manually operated latch 209 to prevent the premature delivering of a charge of material.

*Operation of the embodiment of Figure 15*

In considering the operation of the modification of Figure 15, assume that the parts occupy their Figure 15 position wherein the container 205 is delivering a charge of material into the chamber 211 through the opening 210. As soon as the charge of material has poured from the container, the weight 206 is effective to rotate the arm 207 and container clockwise about their pivotal support. The weight 206 is effective to move the container past the latch 209 and into engagement with the arm 203 thus opening the gate 202. As soon as the gate 202 is opened powdered material within the hopper 200 pours through the feed passage 201 and into the container 205 until the weight of the material within the container over-balances the weight 206 and moves the said container downwardly out of engagement with the arm 203 thereby permitting the gate 202 to close. The container 205 moves downwardly until stopped by the latch 209, where it remains until the latch is manually actuated.

The charge of material which had been delivered to the chamber 210 is compacted between plungers 213 and 212 by actuating the latter by the motor 217. The induction coil 215 may be energized during the compacting cycle so as more or less completely to sinter the workpiece. Following the accomplishment of the compacting and sintering, the plunger 213 is retracted from the compacting chamber and the plunger 212 ejects the workpiece of briquette. Following the ejection the compacting plungers are returned to their Figure 15 position and a new charge may be delivered to the chamber 211 by actuating the latch 209.

It will be apparent that the induction coil associated with the feed passage 201 may be energized to provide for any degree of preheating of the material desired. Also, that the particular amount of charge may be predetermined by the adjustment of the weight 206 on the arm 207.

Figure 17:
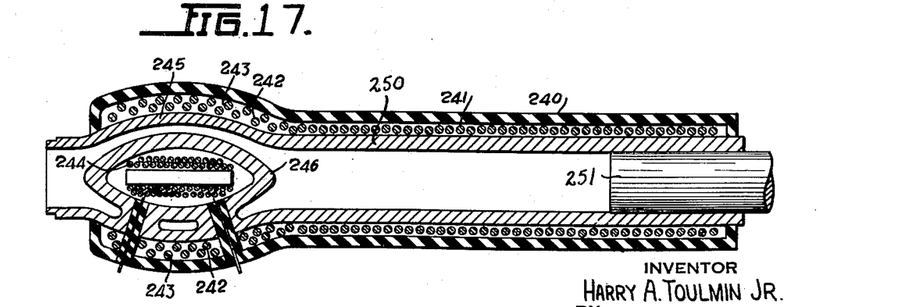
Figure 17 is a sectional view showing a modified form of preheating chamber.

In Figure 17 is shown an arrangement whereby a charge of material, such as powdered metal, may be thoroughly heated and intimately mixed in a heating chamber from which it may be forced into a compacting chamber or a die. In this figure a cylinder 250 has reciprocable therein a plunger 251. The cylinder 250 has an enlarged diameter portion at 245 and has arranged therein a spreader or torpedo 246 terminating in an open end adapted to cooperate with a compacting chamber or die opening.

The spreader 246 is fitted with an internal coil as at 244 for the purpose of heating the torpedo or supplying energy to the material which is disposed thereabound. The chamber 250 has arranged therearound a coil 241 and an insulating sleeve 240, while the portion 245 has associated therewith the double coil 242, 243.

In operation, a charge of material is placed within the chamber 250 ahead of the plunger 251 and is heated by the coil 241. When the plunger is actuated to force the charge leftwardly through the chamber, the said charge is forced to pass between the spreader 246 and the enlarger portion 245. In passing through this zone, the powdered material is intimately mixed and, since it is restrained to a relatively thin passage, becomes thoroughly and uniformly heated. It will be apparent that the chamber 250 is preferably filled at all times and that the temperature of the material be raised to substantially sintering temperature as it passes the spreader 246. Also, it is conceivable that the arrangement of Figure 17, as well as the other modifications, could be used for material other than powdered metal. For example, certain resin bonded powdered metals are well adapted to be heated and compacted by the apparatus of this invention.

Accordingly, it will be understood that I do not wish to be limited to the specific arrangements and showings in my invention and in the drawings, but desire to comprehend such modifications of structure and arrangement and substitution of equivalents as may come within the scope of the appended claims and the invention.

Having thus fully described my invention, what I claim as new and desire to secure by Letters Patent, is:

1. In combination in an apparatus for compacting materials at least a part of which is metal, a mold, a feed chamber in alignment with said mold, a feed passage communicating with said feed chamber, a hopper communicating with said passage, a pressing plunger reciprocable in said mold and said feed chamber, a second plunger reciprocable in said mold and forming a removable bottom therefor, an induction coil associated with said mold for establishing a field of electromagnetic induction therein when energized, an induction coil associated with said passage, means operable to permit a predetermined amount of material to pass from said hopper into said passage, means for energizing said induction coil associated with said passage so as to heat said predetermined quantity of material, means for actuating said pressing plunger so as to permit said heated material to pass into said feed chamber and thereafter to move said material into said mold and to compress the same therein against said removable mold bottom, means for energizing said induction coil associated with said mold for heating said compacted material to substantially sintering temperature, and means for ejecting said workpiece from said mold.

2. In an apparatus for molding granulated metallic materials, a mold, a member forming a bottom for said mold, motor means attached to said member and selectively operable for retracting said member from said mold, means associated with said mold for inductively heating the material therein, a feed cylinder connected with said mold, a chamber connected with said feed cylinder for supplying material thereto, means associated with said chamber for inductively heating the material therein, a plunger reciprocable in said chamber for moving said material into said feed cylinder, ratchet means associated with said feed plunger for moving said plunger a predetermined distance during each cycle, a pressing plunger reciprocable in said feed chamber and said mold for transferring said material from said feed chamber into said mold and for compacting the same in said mold, and means operable automatically for actuating said ratchet mechanism during the retraction stroke of said pressing plunger.

3. In an apparatus for compacting powdered metals, a mold, a feed chamber integral with said mold, a second chamber opening into said feed chamber for containing powder to be transferred into said feed chamber, a pressing plunger reciprocable in said feed chamber and said mold, a member adapted to form a mold bottom, a plunger reciprocable in said second chamber, said last mentioned plunger being provided with a plurality of equidistantly spaced notches, a pivoted member adapted to engage said notches, motor means associated with said last mentioned plunger for continuously urging the same upwardly, motor means associated with said pressing plunger for reciprocating the same, motor means associated with said mold bottom for retracting the same from said mold, means responsive to the retracting movement of said pressing plunger for momentarily withdrawing said pivoted member from said notches, and means for establishing a field of alternating electromagnetic induction in said mold and said second chamber for heating the materials therein.

4. In a press for compacting powdered metals, a compacting chamber, a feed chamber in alignment therewith, a pair of opposed plungers reciprocable in said feed chamber and said compacting chamber for transferring said powder from said feed chamber into said compacting chamber and for compressing it in the latter, means automatically operable for transferring a predetermined quantity of powder into said feed chamber, and means comprising an induction coil for heating said powder to sintering temperature in said compacting chamber.

5. In a press for compacting powdered or granulated metals, a compacting chamber, a feed chamber in axial alignment with said compacting chamber, a supply means connected with said feed chamber for supplying said metal thereto, a pair of opposed pressing plungers reciprocable in said chambers, motor means selectively operable for causing said plungers to transfer material from said feed chamber to said compacting chamber and for compacting it in the latter, means for retracting one of said plungers from said compacting chamber while advancing the other of said plungers for ejecting the compacted workpiece, means automatically operable in response to the reciprocation of one of said plungers for supplying a measured quantity of said metal to said feed chamber, and means comprising induction coils for preheating said metal prior to its entrance into said feed chamber and also for heating it within said compacting chamber.

6. In a press for compacting powdered metals into substantially solid workpieces, a feed chamber for receiving a quantity of said powder, means for creating an alternating field of electro-magnetic induction within the powder supplied to said chamber for preheating the same, a die cavity within which said preheated powder is to be compacted, means for creating an alternating field of electro-magnetic induction in the powder in said cavity for heating the same to sintering temperature, and opposed pressing members operable during one and the same stroke to transfer the preheated material from said feed chamber into said die cavity and for compacting it therein.

7. In a press for compacting granulated materials, a feed chamber for receiving said material, means adjustable for determining the quantity of material supplied to said chamber, a compacting chamber, means comprising induction coils for heating the material supplied to said feed chamber and also the material in said compacting chamber, and means comprising opposed pressing plungers and actuating motors therefor for transferring the material from said feed chamber to said compacting chamber and for compacting it therein and for ejecting the workpiece therefrom.

8. In a press for compacting granulated materials, a mold for receiving a predetermined quantity of said material, a pair of plungers mounted for reciprocation in said mold and operable to compact said material therebetween, an induction coil wound around said mold and operable when energized to heat the material within said mold by electro-magnetic induction, a material containing means in which one of said plungers is reciprocable, an induction coil wound around said containing means and operable when energized to heat the material therein, means for actuating said one plunger to transfer material from said containing means to said mold, means for effecting relative movement between said plungers to compact said material within said mold, means for retracting one of said plungers from said mold to permit the ejection therefrom of said compacted material and means for actuating the other of said plungers to accomplish said ejection.

9. In a press for compacting powdered metals, a compacting chamber, a feed chamber, a pair of opposed plungers reciprocable in said compacting chamber for compacting material therein and at least one thereof reciprocable in said feed chamber for transferring powder into said compacting chamber, means for supplying material to said feed chamber and means adjustable for determining the exact quantity of said supply of material, and means comprising an induction coil for heating said material in said compacting chamber.

10. In a press for compacting powdered metals, a compacting chamber, a feed chamber, a pair of opposed plungers reciprocable in said compacting chamber for compacting material therein and at least one thereof reciprocable in said feed chamber for transferring powder into said compacting chamber, means for supplying material to said feed chamber and means adjustable for determining the exact quantity of said supply of material, and means comprising induction coils for heating said material before and after the delivery thereof to said compacting chamber.

11. In a press for compacting powdered or granulated material, a mold, a chamber arranged in axial alignment with said mold, a hopper connected with said chamber for supplying said material thereto, a pair of plungers reciprocable in said mold and at least one thereof being reciprocable in said chamber, means for positioning said plungers a predetermined position apart within said chamber so as to receive a predetermined charge of material therebetween from said hopper, means for moving said plungers in unison from said chamber into said mold, means for halting one of said plungers while continuing the movement of the other so as to compact said material between said plungers, means for retracting said last mentioned plunger together with said chamber from said mold, means operable for actuating the other of said plungers for ejecting said compact, and means comprising induction coils for heating the material before it is delivered to said mold and also for heating said compact within said mold by electro-magnetic induction.

12. In an apparatus for compacting divided materials at least a portion of which is metal, a compacting chamber, a feed chamber, a passage connecting said chambers, a pair of opposed pressing members reciprocable in said compacting chamber for compacting material therein and at least one thereof reciprocable in said feed chamber and said passage for transferring material to said compacting chamber, motor means selectively operable for actuating said plungers, means operable automatically to supply weighed charges of material to said feed chamber, and means comprising an induction coil for heating the material within said compacting chamber by electro-magnetic induction.

13. In an apparatus for compacting divided materials at least a portion of which is metal, a compacting chamber, a feed chamber, a passage connecting said chambers, a pair of opposed pressing members reciprocable in said compacting chamber for compacting material therein and at least one thereof reciprocable in said feed chamber and said passage for transferring material to said compacting chamber, motor means selectively operable for actuating said plungers, means operable automatically to supply weighed charges of material to said feed chamber, and means comprising induction coils for preheating the material prior to the weighing thereof and also for heating the material in the compacting chamber.

HARRY A. TOULMIN, Jr.